(12) United States Patent
Kim

(10) Patent No.: US 9,906,383 B2
(45) Date of Patent: Feb. 27, 2018

(54) SEMICONDUCTOR DEVICE, SEMICONDUCTOR SYSTEM AND METHOD OF OPERATING SEMICONDUCTOR DEVICE

(71) Applicant: SAMSUNG ELECTRONICS CO., LTD., Suwon-si (KR)

(72) Inventor: Chiwon Kim, Hwasung (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 92 days.

(21) Appl. No.: 15/008,613

(22) Filed: Jan. 28, 2016

(65) Prior Publication Data

US 2016/0226651 A1 Aug. 4, 2016

Related U.S. Application Data

(60) Provisional application No. 62/110,743, filed on Feb. 2, 2015.

(30) Foreign Application Priority Data

Apr. 20, 2015 (KR) .................. 10-2015-0055406

(51) Int. Cl.
*H04L 25/02* (2006.01)
(52) U.S. Cl.
CPC ................................. *H04L 25/026* (2013.01)
(58) Field of Classification Search
CPC .................................................. H04L 25/026
See application file for complete search history.

(56) References Cited

U.S. PATENT DOCUMENTS

| 7,222,290 | B2 | 5/2007 | Guo et al. |
| 7,376,531 | B1 | 5/2008 | Pham et al. |
| 7,581,890 | B2 | 9/2009 | Crew |
| 7,855,576 | B1 | 12/2010 | Luo et al. |
| 8,005,999 | B1 | 8/2011 | Felton et al. |
| 8,144,817 | B1 | 3/2012 | Savoj et al. |
| 8,447,892 | B1 | 5/2013 | Felton et al. |
| 2003/0206048 | A1* | 11/2003 | Toyoshima ........... H04L 25/061 327/524 |
| 2004/0128595 | A1* | 7/2004 | Schoenborn ..... G01R 31/31723 714/724 |
| 2005/0104623 | A1 | 5/2005 | Guo et al. |
| 2007/0266186 | A1 | 11/2007 | Woodral |
| 2008/0037994 | A1 | 2/2008 | Crews |

(Continued)

*Primary Examiner* — Freshteh N Aghdam
(74) *Attorney, Agent, or Firm* — Sughrue Mion, PLLC

(57) ABSTRACT

The semiconductor device according to an exemplary embodiment includes: a driver configured to output first and second signals complementary to each other through first and second nodes, respectively; and a receiver detector configured to detect whether a reception circuit of an active state is connected to the first node and the second node according to a voltage of the first node and a voltage of the second node. The receiver detector is configured to compare the voltage of the first node with a first reference voltage, compare the voltage of the second node with a second reference voltage, and detect whether the reception circuit of the active state is connected according to a comparison result of the voltage of the first node and a comparison result of the voltage of the second node.

20 Claims, 13 Drawing Sheets

(56) References Cited

U.S. PATENT DOCUMENTS

| | | | |
|---|---|---|---|
| 2012/0023344 A1* | 1/2012 | Miyanaga | G06F 13/4072 713/310 |
| 2012/0235704 A1 | 9/2012 | Yeung et al. | |
| 2013/0007489 A1 | 1/2013 | Unnikrishnan et al. | |
| 2014/0254650 A1 | 9/2014 | Bergkvist, Jr. et al. | |
| 2014/0317432 A1 | 10/2014 | Rao | |

* cited by examiner

SEMICONDUCTOR DEVICE, SEMICONDUCTOR SYSTEM AND METHOD OF OPERATING SEMICONDUCTOR DEVICE

CROSS-REFERENCE TO RELATED APPLICATIONS

This application claims priority from U.S. provisional patent application No. 62/110,743 filed on Feb. 2, 2015 and claims priority from Korean Patent Application No. 10-2015-0055406, filed on Apr. 20, 2015, the entire disclosures of which are incorporated herein by reference.

BACKGROUND

Apparatuses and methods consistent with exemplary embodiments relate to a semiconductor device, and more particularly, to a semiconductor device, a semiconductor system, and a method of operating the semiconductor device.

Various semiconductor devices or circuits are combined to form a semiconductor device that performs a specific function. For example, examples of the semiconductor devices may include an application processor that drives applications, a MODEM (modulator and demodulator) that performs a telecommunication, an image signal processor (ISP) that processes an image signal, a digital signal processor (DSP) that processes a digital signal, a power management integrated circuit (PMIC) that controls power, etc.

Semiconductor devices that perform various functions are combined to form a semiconductor system that provides convenience to a user. For example, examples of a semiconductor system may include a smart phone, a smart pad, a smart watch, a smart television, a computer, a notebook computer, etc.

Semiconductor devices that form a semiconductor system are configured to communicate with one another. As a level of a voltage being consumed in semiconductor devices is reduced and a frequency of a signal being used in semiconductor devices increases, probability that malfunction may occur in a communication between semiconductor devices increases. Thus, a device and a method for obtaining reliability of a communication between semiconductor devices are required.

SUMMARY

According to an aspect of an exemplary embodiment, there is provided a semiconductor device including a driver configured to output first and second signals complementary to each other through first and second nodes, respectively; and a receiver detector configured to detect whether a reception circuit of an active state is connected to the first node and the second node according to a voltage of the first node and a voltage of the second node. The receiver detector is configured to compare the voltage of the first node with a first reference voltage, compare the voltage of the second node with a second reference voltage, and detect whether the receiving circuit of the active state is connected according to a comparison result of the voltage of the first node and a comparison result of the voltage of the second node.

The receiver detector may determine that the reception circuit of the active state is not connected in response to detecting that the voltage of the first node is higher than the first reference voltage or the voltage of the second node is lower than the second reference voltage, the second reference voltage being lower than the first reference voltage.

The receiver detector may determine that the reception circuit of the active state is connected in response to detecting that the voltage of the first node is lower than the first reference voltage and the voltage of the second node is higher than the second reference voltage, the second reference voltage being lower than the first reference voltage.

The receiver detector may comprise a first comparator configured to output a high level signal in response to determining that the voltage of the first node is lower than the first reference voltage, a second comparator configured to output a high level signal in response to determining that the voltage of the second node is higher than the second reference voltage, and a logical gate circuit configured to output a logical AND of an output of the first comparator and an output of the second comparator, and may determine that the reception circuit of the active state is connected in response to determining that an output of the logical gate circuit is high level.

The receiver detector may comprise first through fourth resistors serially connected between a power supply node from which a power supply voltage is supplied and a ground node from which a ground voltage is supplied. A voltage of a node between the first and second resistors adjacent to the power supply node is used as the first reference voltage, and a voltage of a node between the third and fourth resistors adjacent to the ground node is used as the second reference voltage.

The driver may output a third signal increasing from a common voltage to a first voltage which is higher than the common voltage through the first node and output a fourth signal decreasing from the common voltage to a second voltage which is lower than the common voltage through the second node.

The driver and the receiver detector may perform, in response to determining that a power supply is supplied to the semiconductor device, the receiver detecting operation to detect whether the reception circuit of the active state is connected.

The driver becomes inactive in response to determining that the reception circuit of the active state is not connected.

The semiconductor device further comprises a second reception circuit configured to be connected to the first node and the second node and receive third and fourth signals complementary to each other being transmitted from an external device.

The receiver detector may detect an active state of the reception circuit by using a slope that the voltage of the first node increases and a slope that the voltage of the second node decreases.

According to an aspect of another exemplary embodiment, there is provided a semiconductor system including a first semiconductor device comprising transmission circuits, a second semiconductor device comprising reception circuits, and channels connecting the transmission circuits and the reception circuits, respectively. Each of the transmission circuits is connected to a corresponding receiving circuit among the reception circuits through a first signal line and a second signal line of a corresponding channel among the channels. Each of the transmission circuits is configured to detect whether the corresponding receiving circuit is in an active state according to a voltage of the first signal line and a voltage of the second signal line.

Each of the transmission circuits may determine that the corresponding reception circuit is in an inactive state in response to detecting that at least one of the voltage of the first signal line and the voltage of the second signal line indicates that the corresponding reception circuit is in an inactive state.

Each of the transmission circuits may determine that the corresponding reception circuit is in an active state in response to detecting that the voltage of the first signal line is lower than a first reference voltage and the voltage of the second signal line is higher than a second reference voltage, the second reference voltage being lower than the first reference voltage.

The first semiconductor device comprises second reception circuits, the second semiconductor device comprises second transmission circuits, and the semiconductor system comprises second channels connecting the second transmission circuits and the second reception circuits, respectively.

Each of the second transmission circuits may be connected to a corresponding second reception circuit among the second reception circuits through a third signal line and a fourth signal line of a corresponding second channel among the second channels, and may detect whether the corresponding second reception circuit is in an active state according to a voltage of the third signal line and a voltage of the fourth signal line.

The first semiconductor device comprises second reception circuits, the second semiconductor device comprises second transmission circuits, and the second transmission circuits are connected to the second reception circuits respectively through the channels.

Each of the second transmission circuits may detect whether the corresponding second receiving circuit is in an active state according to the voltage of the first signal line and the voltage of the second signal line.

The second reception circuits of the first semiconductor device become inactive in response to determining that the transmission circuits of the first semiconductor device perform a receiver detecting operation.

According to an aspect of another exemplary embodiment, there is provided a semiconductor system including a first semiconductor device comprising transmission circuits, a second semiconductor device comprising reception circuits, and channels connecting the transmission circuits and the reception circuits, respectively. The first semiconductor device may comprise a driver configured to output first and second signals complementary to each other through first and second nodes, respectively and a receiver detector configured to detect whether a reception circuit of an active state is connected to the first node and the second node according to a voltage of the first node and a voltage of the second node. The second semiconductor device may comprise a receiver configured to output first and second signals to core circuits of the first semiconductor device and the second semiconductor device, respectively and a balance circuit configured to provide a balance between voltages of a first input node and a second input node. Each of the transmission circuits is configured to detect whether the corresponding reception circuit is in an active state according to a voltage of a first signal line and a voltage of a second signal line.

The balance circuit of the second semiconductor may comprise first and second resistors which are serially connected between the first and second input nodes, and control voltages of the first and second input nodes so that a voltage of the first input node and a voltage of the second input node swing with a common voltage as the center.

BRIEF DESCRIPTION OF THE DRAWINGS

Exemplary embodiments will be described below in more detail with reference to the accompanying drawings, in which.

DETAILED DESCRIPTION OF EXEMPLARY EMBODIMENTS

Figure 1:
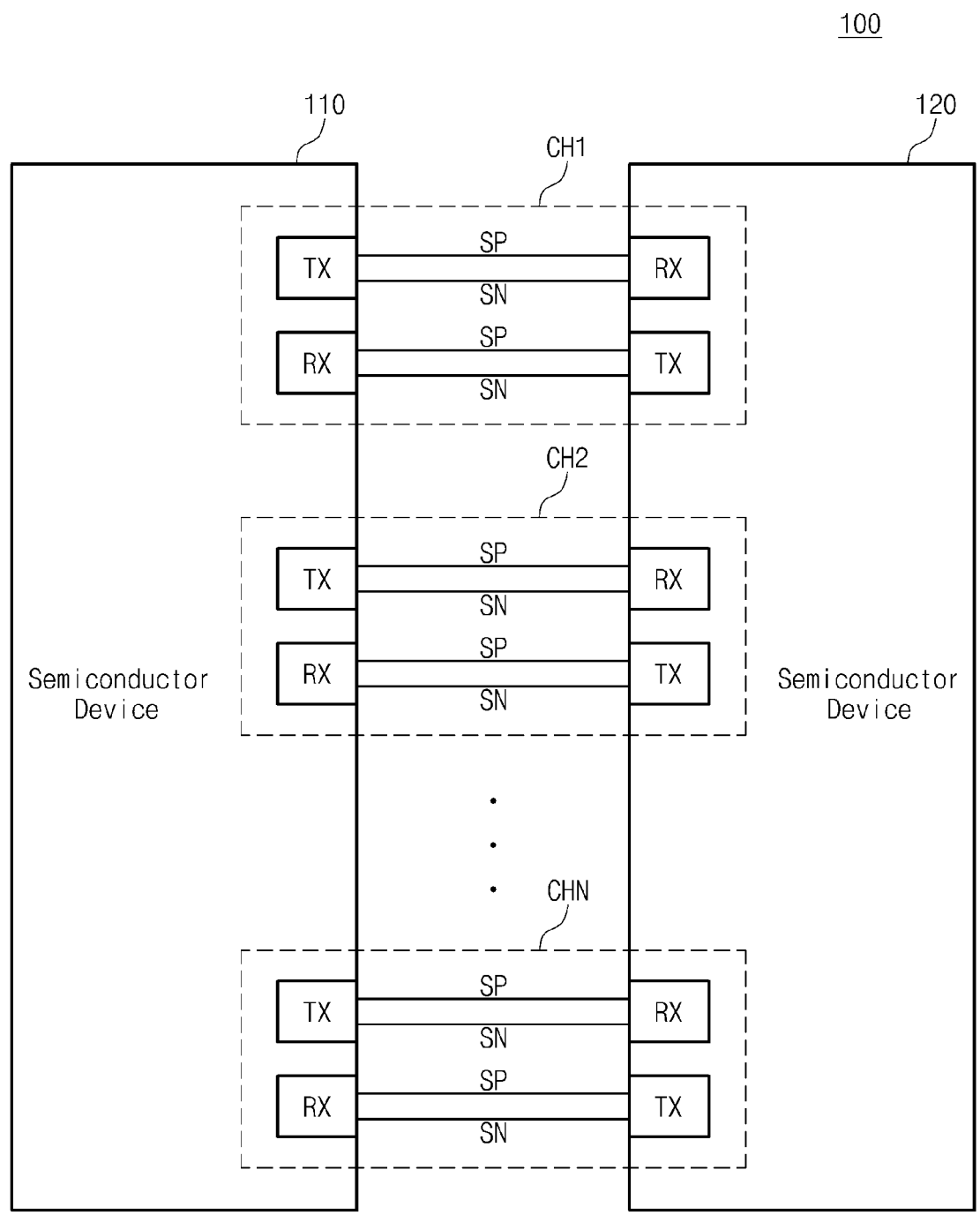
FIG. 1 is a block diagram illustrating a semiconductor system in accordance with an exemplary embodiment.

Exemplary embodiments will be described more fully hereinafter with reference to the accompanying drawings. This inventive concept may, however, be embodied in many different forms and should not be construed as limited to the exemplary embodiments set forth herein. Rather, the exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

FIG. 1 is a block diagram illustrating a semiconductor system in accordance with an exemplary embodiment. Referring to FIG. 1, a semiconductor system 100 may include a first semiconductor device 110 and a second semiconductor device 120.

The first and second semiconductor devices 110 and 120 are configured to communicate with each other through first through Nth channels CH1-CHN. The first semiconductor device 110 may include transmission circuits TX and reception circuits RX corresponding to the first through Nth channels CH1-CHN, respectively. The second semiconductor device 120 may include reception circuits RX and transmission circuits TX corresponding to the first through Nth channels CH1-CHN, respectively.

For example, in the first channel CH1, a transmission circuit TX of the first semiconductor device 110 may be connected to a reception circuit RX of the second semiconductor device 120 through a first signal line SP and a second signal line SN. In the first channel CH1, a transmission circuit TX of the second semiconductor device 120 may be connected to a reception circuit RX of the first semiconductor device 110 through a first signal line SP and a second signal line SN. In the first channel CH1, the transmission circuit TX and the reception circuit RX of the first semiconductor device 110 have the same structure as the transmission circuit TX and the reception circuit RX of the second semiconductor device 120, and may operate in the same manner as the transmission circuit TX and the reception circuit RX of the second semiconductor device 120.

The second through Nth channels CH2-CHN may have the same structure as the first channel CH1, respectively. Thus, detailed description of the second through Nth channels CH2~CHN is omitted.

The number of active channels among the first through Nth channels CH1-CHN of the first and second semiconductor devices 110 and 120 may be determined according to a design of the semiconductor system 100. For example, the first and second semiconductor devices 110 and 120 are connected to each other through N number of channels and K (K is an integer equal to or greater than 1 and equal to or smaller than N) number of channels among the N number of channels may be used as active channels. N minus K number of channels may be set as inactive channels and may not be used.

In another example, the number of active channels may be determined according to structures of the first and second semiconductor devices 110 and 120. For example, the first semiconductor device 110 may include transmission circuits TX and reception circuits RX corresponding to the N number of channels. The second semiconductor device 120 may include transmission circuits TX and reception circuits RX corresponding to M (M is a positive integer smaller than N) number of channels. M number of transmission circuits TX and reception circuits RX of the first semiconductor device 110 may be connected to M number of reception circuits RX and transmission circuits TX of the second semiconductor device 120 respectively through the M number of channels. N minus M number of transmission circuits TX and reception circuits RX of the first semiconductor device 110 cannot be connected to reception circuits RX and transmission circuits TX of the second semiconductor device 120. That is, in the first semiconductor device, the M number of channels may be active channels and the remaining N minus M number of channels may be inactive channels.

The number of channels of the first semiconductor device 110 or the second semiconductor device 120 may be determined when the first semiconductor device 110 or the second semiconductor device 120 is manufactured. However, the number of active channels or the number of inactive channels of the first semiconductor device 110 or the second semiconductor device 120 may be different depending on a characteristic of the semiconductor system 100, or a characteristic of an opponent device that communicates with the first semiconductor device 110 or the second semiconductor device 120.

The first semiconductor device 110 or the second semiconductor device 120 may include a function that can distinguish the number of active channels or the number of inactive channels. For example, transmission circuits TX of the first semiconductor device 110 or the second semiconductor device 120 may include a receiver detecting function that distinguishes whether a reception circuit RX of an active state is connected.

For example, if a reception circuit RX of the second semiconductor device 120 connected to a transmission circuit TX of the first semiconductor device 110 is in an active state, it may be determined that the transmission circuit TX of the first semiconductor device 110 is connected to a reception circuit RX of an active state. In this case, the transmission circuit TX of the first semiconductor device 110 may be set to communicate with the reception circuit RX of the second semiconductor device 120.

For example, if the reception circuit RX of the second semiconductor device 120 connected to the transmission circuit TX of the first semiconductor device 110 is in an inactive state, it may be determined that the transmission circuit TX of the first semiconductor device 110 is not connected to a reception circuit RX of an active state. In this case, the transmission circuit TX of the first semiconductor device 110 becomes inactive and may be set not to communicate with the reception circuit RX of the second semiconductor device 120.

For example, if the reception circuit RX of the second semiconductor device 120 is not connected to the transmission circuit TX of the first semiconductor device 110, it may be determined that the transmission circuit TX of the first semiconductor device 110 is not connected to a reception circuit RX of an active state. In this case, the transmission circuit TX of the first semiconductor device 110 may become inactive.

Similarly, a transmission circuit TX of the second semiconductor circuit 120 may perform a receiver detecting operation that distinguishes whether a reception circuit RX of an active state is connected.

The first and second semiconductor devices 110 and 120 can perform the receiver detecting operation described above when a power supply is supplied. After the receiver detecting operation is performed, the first and second semiconductor devices 110 and 120 can communicate with each other through active channels.

Figure 2:
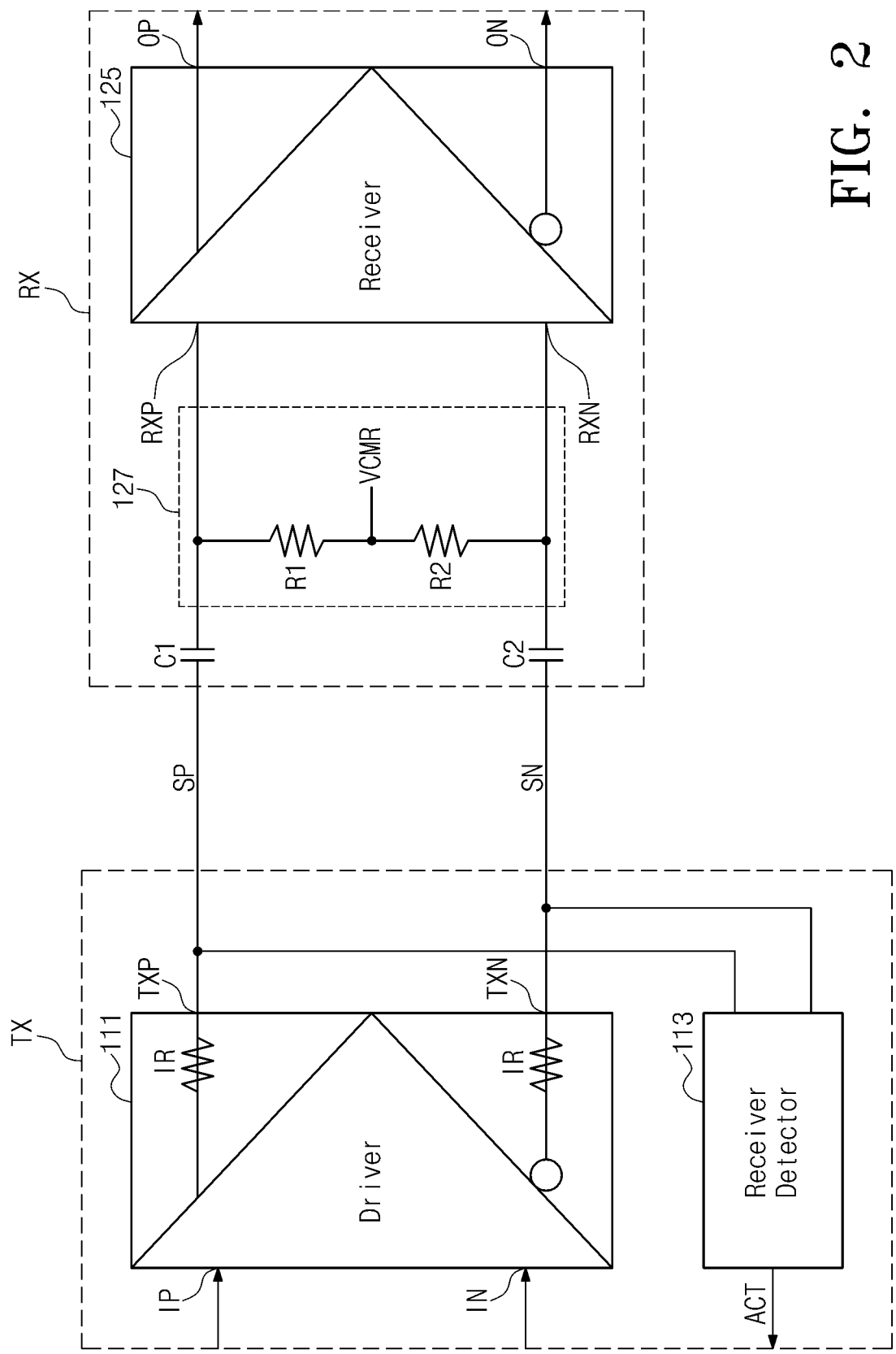
FIG. 2 illustrates a transmission circuit in accordance with an exemplary embodiment and a reception circuit corresponding to the transmission circuit.

FIG. 2 illustrates a transmission circuit in accordance with an exemplary embodiment and a reception circuit corresponding to the transmission circuit. The transmission circuit TX may be the transmission circuit TX of one of the first and second semiconductor devices 110 and 120 and the reception circuit RX may be the reception circuit RX of another one of the first and second semiconductor devices 110 and 120.

Referring to FIGS. 1 and 2, the transmission circuit TX may include a driver 111 and a receiver detector 113. In a normal operation, the driver 111 can receive input signals from a core circuit of the first semiconductor device 110 or the second semiconductor device 120 through a first input node IP and a second input node IN. For example, when a communication is performed between the first and second semiconductor devices 110 and 120, complementary differential input signals may be received through the first input node IP and the second input node IN.

In a normal operation, the driver 111 can output output signals to a first signal line SP and a second signal line SN through a first output node TXP and a second output node TXN. For example, when a communication is performed between the first and second semiconductor devices 110 and 120, complementary differential output signals may be output through the first output node TXP and the second output node TXN. For example, the driver 111 can output complementary differential output signals that transit (or swing) between a high level which is higher than a first common voltage VCMX and a low level which is lower than the first common voltage VCMX, with the first common voltage VCMX as the center. The first common voltage VCMX may have a middle (or intermediate) level between a power supply voltage VDD and a ground voltage VSS.

In a receiver detecting operation, the driver 111 can output a signal that increases from the first common voltage VCMX toward a high level which is higher than the first common voltage VCMX through the first output node TXP and can output a signal that decreases from the first common voltage VCMX toward a low level which is lower than the first common voltage VCMX through the second output node TXN. Voltages or signals being supplied to the first output node TXP and the second output node TXN can be supplied through internal resistors IR.

The receiver detector 113 is configured to receive voltages of the first output node TXP and the second output node TXN. According to the voltages of the first output node TXP and the second output node TXN, the receiver detector 113 is configured to distinguish whether a reception circuit RX of an active state is connected to the first output node TXP and the second output node TXN. If it is determined that a reception circuit RX of an active state is connected to the first output node TXP and the second output node TXN, the receiver detector 113 can activate an active signal ACT. If it is determined that a reception circuit RX of an active state is not connected to the first output node TXP and the second output node TXN, the receiver detector 113 can deactivate the active signal ACT.

The reception circuit RX may include first and second capacitors C1 and C2, a receiver 125 and a balance circuit 127. A first input node RXP and a second input node RXN of the receiver 125 are connected to first and second signal lines SP and SN, respectively, through the first and second capacitors C1 and C2. The receiver 125 can output signals to core circuits of the first and second semiconductor devices 110 and 120 through a first output node OP and a second output node ON. For example, if a voltage of the first input node RXP is a high level which is higher than a second common voltage VCMR and a voltage of the second input node RXN is a low level which is lower than the second common voltage VCMR, the receiver 125 can output a high level through the first output node OP and can output a low level through the second output node ON. If a voltage of the first input node RXP is a low level which is lower than the second common voltage VCMR and a voltage of the second input node RXN is a high level which is higher than the second common voltage VCMR, the receiver 125 can output a low level through the first output node OP and can output a high level through the second output node ON.

The balance circuit 127 may include a first resistor R1 and a second resistor R2 that are serially connected between the first input node RXP and the second input node RXN. The first resistor R1 and the second resistor R2 may have the same resistance values. The second common voltage VCMR may be supplied to a node between the first resistor R1 and the second resistor R2. The balance circuit 127 may provide a balance between voltages of the first input node RXP and the second input node RXN. For example, the balance circuit 127 can control voltages of the first and second input nodes RXP and RXN so that a voltage of the first input node RXP and a voltage of the second input node RXN swing with the second common voltage VCMR as the center.

For example, the second common voltage VCMR may be determined by a termination voltage of the receiver 125. For example, if the termination of the receiver 125 includes a pull-up termination using the power supply voltage VDD, the second common voltage VCMR may be the power supply voltage VDD. That is, a voltage of the first input node RXP and a voltage of the second input node RXN may swing with the power supply voltage VDD as the center. For example, if the termination of the receiver 125 includes a pull-down termination using the ground voltage VSS, the second common voltage VCMR may be the ground voltage VSS. That is, a voltage of the first input node RXP and a voltage of the second input node RXN may swing with the ground voltage VSS as the center.

Figure 3:
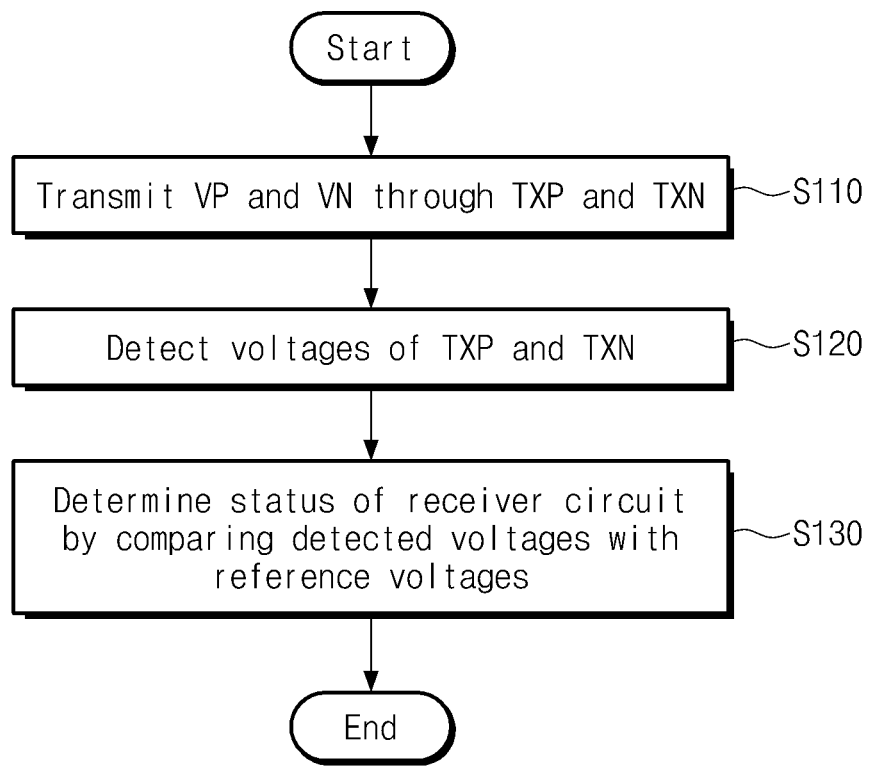
FIG. 3 is a flowchart illustrating a receiver detecting method in accordance with an exemplary embodiment.

FIG. 3 is a flowchart illustrating a receiver detecting method in accordance with an exemplary embodiment.

Referring to FIGS. 1 through 3, in a step S110, the driver 111 of the transmission circuit TX can output a first output signal VP and a second output signal VN through the first output node TXP and the second output node TXN, respectively. For example, the first output signal VP may increase from the first common voltage VCMX toward a high level which is higher than the first common voltage VCMX. The second output signal VN may decrease from the first common voltage VCMX toward a low level which is lower than the first common voltage VCMX.

In a step S120, the receiver detector 113 of the transmission circuit TX can detect voltages of the first output node TXP and the second output node TXN of the driver 111.

In a step S130, the receiver detector 113 can distinguish a state of the reception circuit RX by comparing the detected voltages of the first output node TXP and the second output node TXN with reference voltages, respectively. For example, the receiver detector 113 may compare a voltage of the first output node TXP and a voltage of the second output node TXN with different reference voltages, respectively. According to a result of the comparison, the receiver detector 113 can distinguish whether a reception circuit RX of an active state is connected to the first output node TXP and the second output node TXN.

Figure 4:
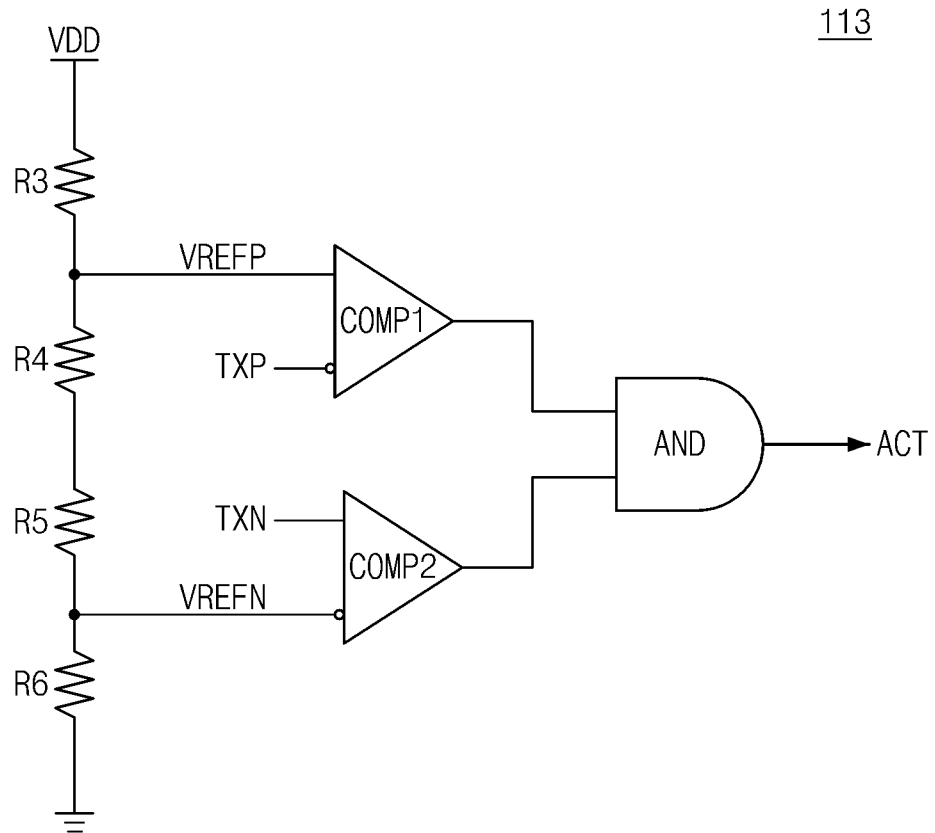
FIG. 4 is a circuit illustrating a receiver detector in accordance with an exemplary embodiment.

FIG. 4 is a circuit illustrating a receiver detector 113 in accordance with an exemplary embodiment. Referring to FIGS. 2 and 4, the receiver detector 113 may include third through sixth resistors R3~R6, first and second comparators COMP1 and COMP2, and an AND operation circuit.

The third through sixth resistors R3~R6 may be serially connected between a power supply node from which a power supply voltage VDD is supplied and a ground node from which a ground voltage VSS is supplied. A voltage of a node between the third resistor R3 and the fourth resistor R4 that are adjacent to the power supply node may be used as a first reference voltage VREFP. A voltage of a node between the fifth resistor R5 and the sixth resistor R6 that are adjacent to the ground node may be used as a second reference voltage VREFN. The third through sixth resistors R3~R6 may form a voltage generator or a voltage divider generating the first reference voltage VREFP and the second reference voltage VREFN. A voltage of a node between the fourth resistor R4 and the fifth resistor R5 may be a first common voltage VCMX. The first reference voltage VREFP may have a level which is higher than the first common voltage VCMX and is lower than the power supply voltage VDD. The second reference voltage VREFN may have a level which is lower than the first common voltage VCMX and is higher than the ground voltage VSS.

The first comparator COMP1 is configured to compare the first reference voltage VREFP and a voltage of the first output node TXP. The first reference voltage VREFP may be transmitted to a positive input of the first comparator COMP1 and the voltage of the first output node TXP may be transmitted to a negative input of the first comparator COMP1. If the voltage of the first output node TXP is lower than the first reference voltage VREFP, the first comparator COMP1 may output a high level signal. If the voltage of the first output node TXP is higher than the first reference voltage VREFP, the first comparator COMP1 may output a low level signal.

The second comparator COMP2 is configured to compare the second reference voltage VREFN and a voltage of the second output node TXN. The second reference voltage VREFN may be transmitted to a negative input of the second comparator COMP2 and the voltage of the second output node TXN may be transmitted to a positive input of the second comparator COMP2. If the voltage of the second output node TXN is lower than the second reference voltage VREFN, the second comparator COMP2 may output a low level signal. If the voltage of the second output node TXN is higher than the second reference voltage VREFN, the second comparator COMP2 may output a high level signal.

The AND operation circuit is configured to perform an AND operation on an output signal of the first comparator COMP1 and an output signal of the second comparator COMP2. An operation result may be output as an active signal ACT.

If a voltage of the first output node TXP is lower than the first reference voltage VREFP, the first comparator COMP1 outputs a high level signal. If a voltage of the second output node TXN is higher than the second reference voltage VREFN, the second comparator COMP2 outputs a high level signal. Thus, If a voltage of the first output node TXP is lower than the first reference voltage VREFP and a voltage of the second output node TXN is higher than the second reference voltage VREFN, the receiver detector 113 outputs an active signal ACT of high level. That is, it is determined that a reception circuit RX of an active state is connected to the first output node TXP and the second output node TXN.

If a voltage of the first output node TXP is higher than the first reference voltage VREFP or a voltage of the second output node TXN is lower than the second reference voltage VREFN, the receiver detector 113 outputs an active signal ACT of low level. That is, it is determined that a reception circuit RX of an active state is not connected to the first output node TXP and the second output node TXN.

Figure 5:
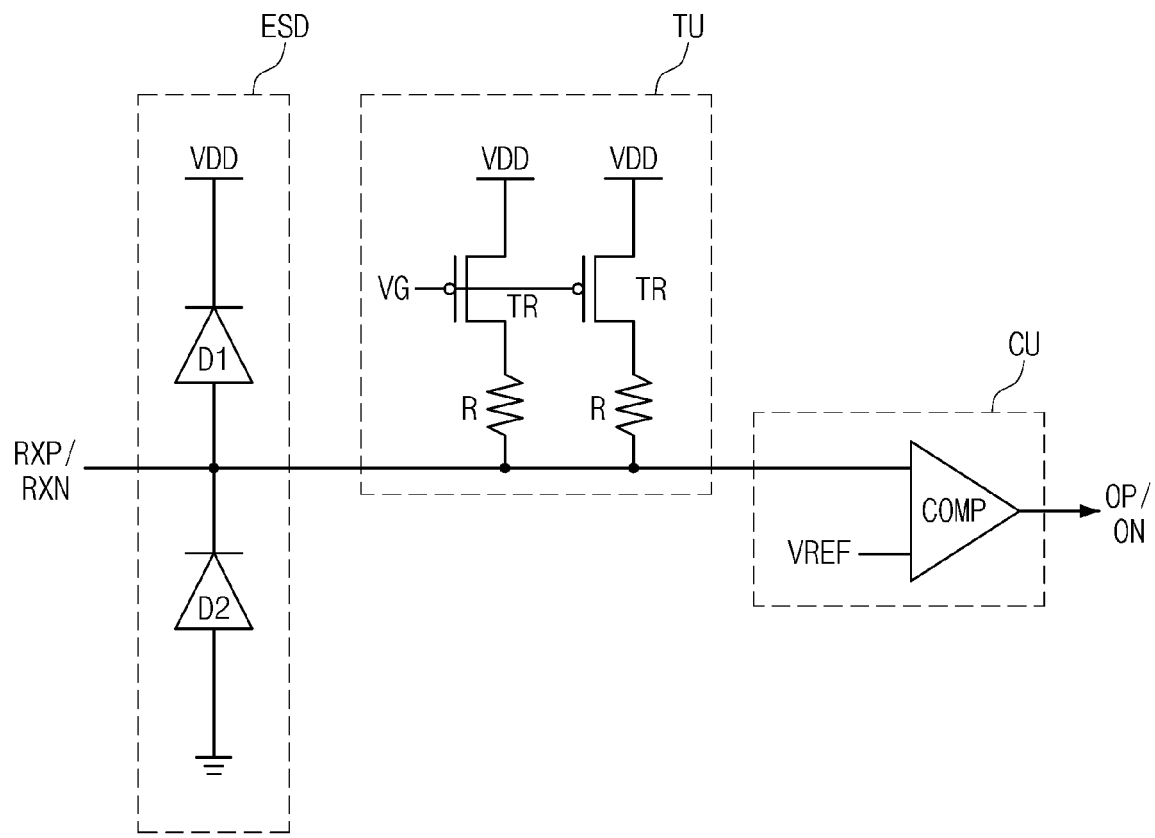
FIG. 5 is a circuit illustrating a receiver in accordance with a first example of the inventive concept.

FIG. 5 is a circuit illustrating a receiver 125a in accordance with a first example of the inventive concept. Constituents involved with the first input node RXP may be the same as constituents involved with the second input node RXN. For brevity of description, constituents involved with one of the first input node RXP and the second input node RXN of the receiver 125a are illustrated. Referring to FIGS. 2 and 5, the receiver 125a may include an overvoltage control unit ESD, a termination unit TU and a comparing unit CU.

The overvoltage control unit ESD may include diodes D1 and D2 that are serially connected between a power supply node from which a power supply voltage VDD is supplied and a ground node from which a ground voltage VSS is supplied. The overvoltage control unit ESD can prevent an overvoltage from being supplied through the first input node RXP or the second input node RXN due to an external noise or an internal malfunction.

For example, an incoming positive overvoltage through the first input node RXP or the second input node RXN may be discharged into the power supply node through the first diode D1. If a voltage of the first input node RXP or the second input node RXN is higher than the power supply voltage VDD by a threshold voltage of the first diode D1, the first diode D1 can form a current path between the first or second input node RXP or RXN and the power supply node.

For example, an incoming negative overvoltage through the first input node RXP or the second input node RXN may be discharged into the ground node through the second diode D2. If a voltage of the first input node RXP or the second input node RXN is lower than the ground voltage VSS by a threshold voltage of the second diode D2, the second diode D2 can form a current path between the first or second input node RXP or RXN and the ground node.

The threshold voltage of the first diode D1 or the second diode D2 may be greater than normal amplitude of a signal being received through the first input node RXP or the second input node RXN.

The termination unit TU is configured to provide an impedance matching between the transmission circuit TX and the reception circuit RX. For example, the termination unit TU may be configured to provide an impedance matching with respect to an internal resistor IR of the driver 111 and first or second signal line SP or SN. The termination unit TU may include termination resistors R and transistors TR. The termination resistors R may be connected between the transistors TR and the first or second input node RXP or RXN. The termination resistors R may be connected to the power supply node through the transistors TR, respectively. The transistors TR may have a p-type.

Gates of the transistors TR may be controlled by a gate voltage VG. For example, if the receiver 125a or the reception circuit RX including the receiver 125a is set to an active state, the transistors TR may be turned on in response to the gate voltage VG. That is, the termination resistors R may be applied to the first input node RXP or the second input node RXN. If the receiver 125a or the reception circuit RX including the receiver 125a is set to an inactive state, the transistors TR may be turned off in response to the gate voltage VG. That is, the termination resistors R may not be applied to the first input node RXP or the second input node RXN. For example, the first input node RXP or the second input node RXN may be floated, and high impedance (e.g., HIGH-Z) may be applied to the first input node RXP or the second input node RXN.

The comparing unit CU may include a comparator COMP. The comparator COMP can compare a voltage of the first input node RXP or the second input node RXN with a reference voltage VREF. A result of the comparison may be transmitted to the first output node OP or the second output node ON.

Figure 6A:
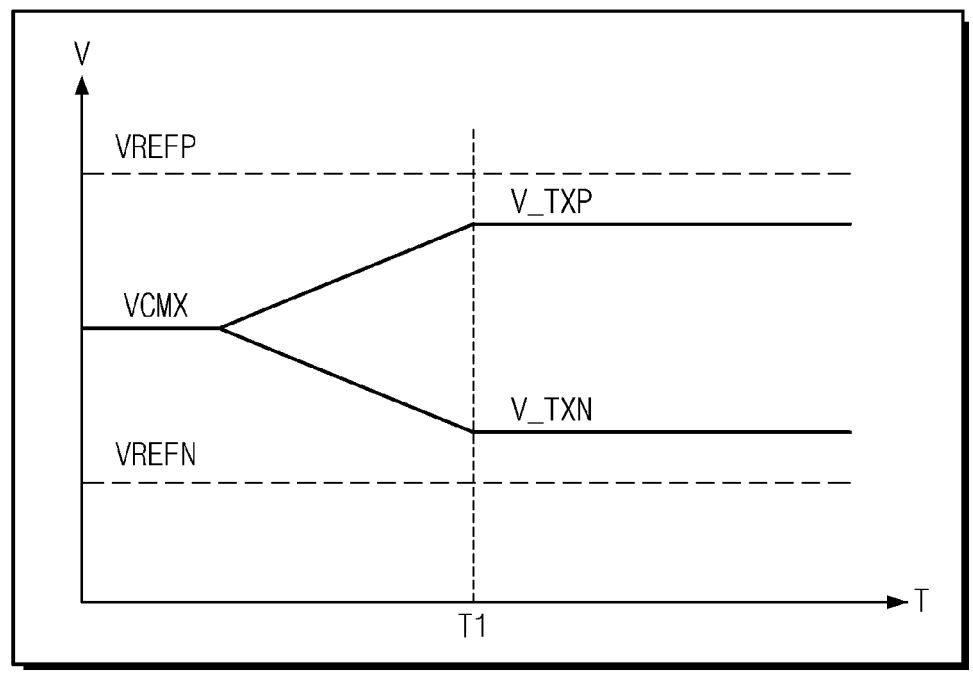
FIGS. 6A and 6B are a graph illustrating a change of voltages when a detection of a receiver is performed according to the first example of the inventive concept.
Figure 6B:
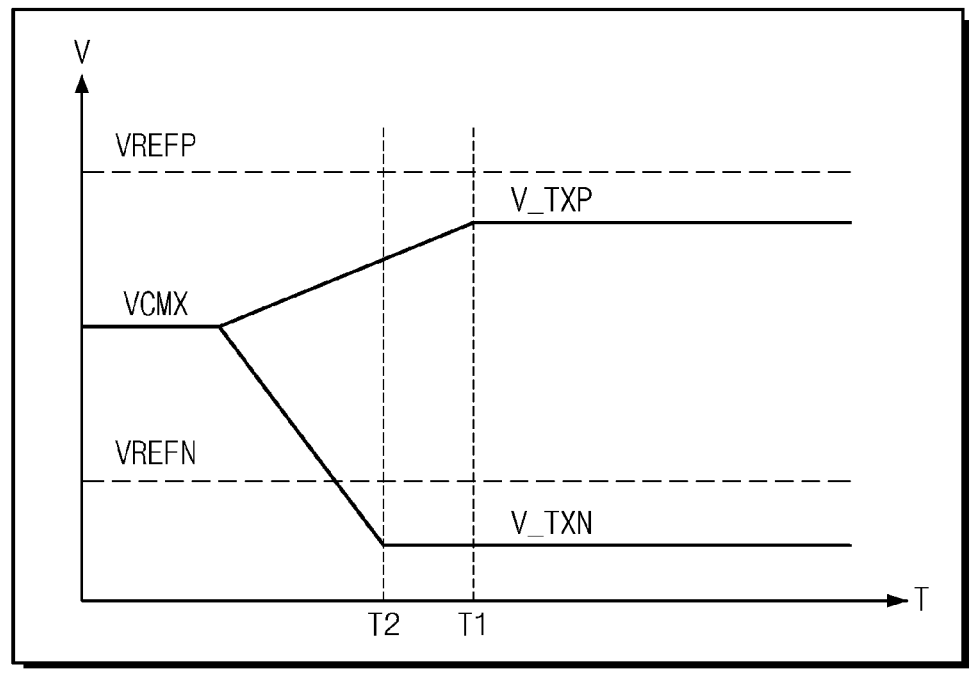

FIGS. 6A and 6B are a graph illustrating a change of voltages when a detection of a receiver is performed according to the first example of the inventive concept. With reference to FIGS. 2, 4, 5 and 6A, a change of voltages of the first output node TXP and the second output node TXN of the driver 111, when a reception circuit RX of an active state is connected to the first output node TXP and the second output node TXN of the driver 111, is explained.

Referring to FIG. 2, in a receiver detecting operation, the driver 111 can output a signal rising from the first common voltage VCMX through the first output node TXP and can output a signal falling from the first common voltage VCMX through the second output node TXN. For example, the driver 111 can transmit a signal rising from the first common voltage VCMX toward the power supply voltage VDD to the internal resistor IR of the first output node TXP. The driver 111 can also transmit a signal falling from the first common voltage VCMX toward the ground voltage VSS to the internal resistor IR of the second output node TXN.

The first output node TXP and the first input node RXP may be connected to each other through the first capacitor C1. If a voltage of the first output node TXP rises, a voltage of the first input node RXP also rises by a coupling of the first capacitor C1. The second output node TXN and the second input node RXN may be connected to each other through the second capacitor C2. If a voltage of the second output node TXN falls, a voltage of the second input node RXN also falls by a coupling of the second capacitor C2.

Referring to FIG. 5, if the transistors TR are turned on, the first input node RXP or the second input node RXN is connected to the power supply node through the termination resistors R. That is, the termination resistors R function as a load connected to the first capacitor C1 or the second capacitor C2.

Thus, as illustrated in FIGS. 2 and 6A, a voltage increment (e.g., the increment of a voltage that increases from the first common voltage VCMX to the power supply voltage VDD) corresponding to the first output node TXP is divided by the internal resistor IR and the termination resistors R. For example, a voltage of the first output node TXP may rise to a level which is lower than the first reference voltage VREFP for a first time T1 during which the first capacitor C1 is charged.

A voltage decrement of the second output node TXN (e.g., the decrement of a voltage that decreases from the first common voltage VCMX to the ground voltage VSS) is divided by the internal resistor IR and the termination resistors R. For example, a voltage of the second output node TXN may decrease to a level which is higher than the second reference voltage VREFN for a first time T1 during which the second capacitor C2 is charged.

Referring to FIGS. 4 and 6A, if a voltage of the first output node TXP is lower than the first reference voltage VREFP and a voltage of the second output node TXN is higher than the second reference voltage VREFN, an active signal of a high level is output. Thus, it is determined that a reception circuit RX of active state is connected to the first output node TXP and the second output node TXN.

With reference to FIGS. 2, 4, 5 and 6B, a change of voltages of the first output node TXP and the second output node TXN of the driver 111, when a reception circuit RX of an active state is not connected to the first output node TXP and the second output node TXN of the driver 111, is explained.

If a reception circuit RX having a pull-up termination becomes inactive, the reception circuit RX can charge the first input node RXP and the second input node RXN with the power supply voltage VDD. For example, referring to FIG. 5, the transistors TR may be turned on and the first and second input nodes RXP and RXN may be charged with the power supply voltage VDD. After that, the transistors TR may be turned off and the reception circuit RX may become inactive.

If the transistors TR are ideally open, the first and second input nodes RXP and RXN are open and have high impedance state (HIGH-Z). For example, as illustrated in FIGS. 2 and 6B, the second output node TXN is connected to the high impedance (HIGH-Z) through the second capacitor C2. A voltage decrement (e.g., the decrement of a voltage that decreases from the first common voltage VCMX to the ground voltage VSS) corresponding to the second output node TXN is not divided by the internal resistor IR and the termination resistors R, and may be applied to the second output node TXN. Thus, a voltage of the second output node TXN may fall to a level which is lower than the second reference voltage VREFN. For example, the voltage of the second output node TXN may decrease during a second time T2 shorter than the first time T1.

If the transistors TR are not ideally open, an error that the termination resistors R are applied to the first input node RXP or the second input node RXN may occur. An example in which a malfunction occurs in the first input node RXP or the second input node RXN is illustrated in FIG. 7.

Figure 7:
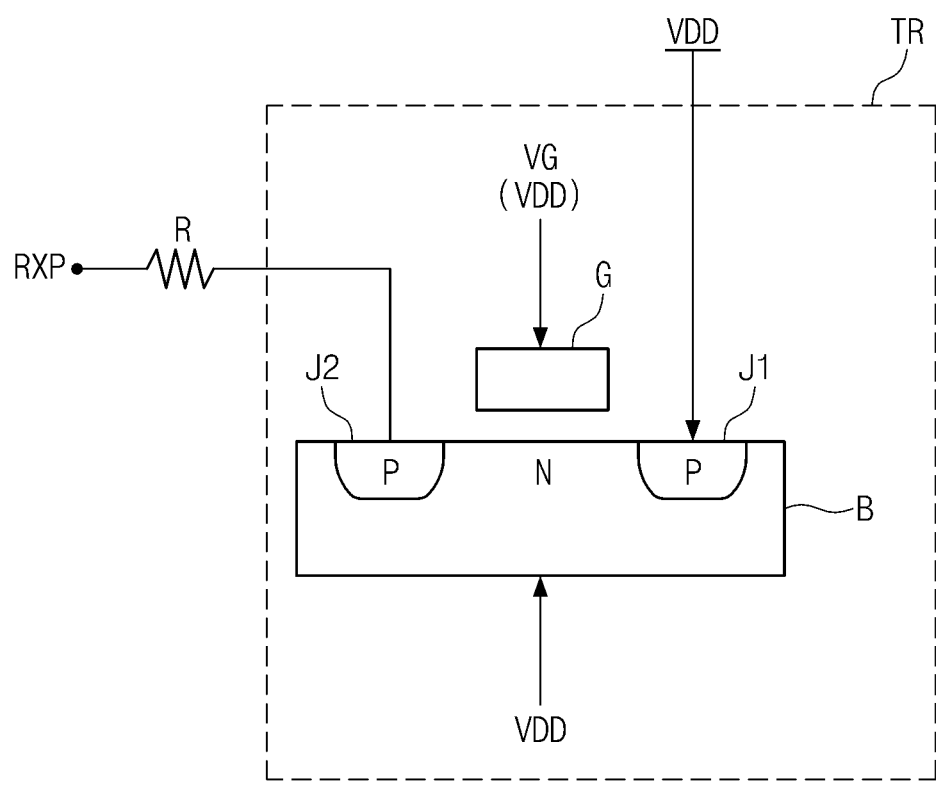
FIG. 7 illustrates an example that malfunction occurs at a first input node or a second input node.

Referring to FIG. 7, a termination resistor R and a transistor TR corresponding to the termination resistor R are illustrated. The transistor TR may include an N type body (B), a P type first junction (J1), a P type second junction (J2) and a gate (G). A gate voltage VG may be supplied to the gate (G). A power supply voltage VDD is supplied as the gate voltage VG to turn off the transistor TR. The first junction (J1) may be connected to a power supply node from which the power supply voltage VDD is supplied. The second junction (J2) may be connected to the second input node RXN through the termination resistor R. The body (B) may be biased by the power supply voltage VDD.

Referring to FIGS. 2, 6B and 7, a voltage of the first output node TXP may increase from the first common voltage VCMX. Due to a coupling by the first capacitor C1, a voltage of the first input node RXP may also increase. For example, the voltage of the first input node RXP may increase from the power supply voltage VDD.

The second junction (J2) and the body (B) of the transistor TR form a PN junction. If a voltage of the first input node RXP becomes higher than the power supply voltage VDD, a leakage may occur between the second junction (J2) and the body (B) of the transistor TR. For example, if the second junction (J2) and the body (B) of the transistor TR are forward biased, a current path may be formed between the first input node RXP and the body (B). Thus, the termination resistor R may be applied to the first input node RXP. A voltage increment (e.g., the increment of a voltage that increases from the first common voltage VCMX to the power supply voltage VDD) corresponding to the first output node TXP may be divided by the internal resistor IR of the first output node TXP and the termination resistors R of the first input node RXP. Thus, a voltage of the first output node TXP may increase to a level which is lower than the first reference voltage VREFP.

As illustrated in FIG. 4, if a voltage of the first output node TXP is lower than the first reference voltage VREFP and a voltage of the second output node TXN is higher than the second reference voltage VREFN, the receiver detector 113 determines that an activated reception circuit RX is connected to the first output node TXP and the second output node TXN. Thus, even if the malfunction occurs, the receiver detector 113 can normally distinguish whether the activated reception circuit RX is connected to the first output node TXP and the second output node TXN. Thus, reliability of the receiver detector 113 and a semiconductor device including the receiver detector 113 may be improved.

The receiver detector 113 may be applied to distinguish an active state of the reception circuit RX using a slope that the voltage of the first output node TXP increases and a slope that the voltage of the second output node TXN decreases. As described with reference to FIGS. 6A and 6B, if the reception circuit RX is activated, the voltage of the first output node TXP or the second output node TXN increases or decreases during the first time T1. If the reception circuit RX is inactivated, the voltage of the first output node TXP or the second output node TXN increases or decreases during the second time T2 shorter than the first time T1. The receiver detector 113 can distinguish an active state of the reception circuit RX at a third time T3 precedent to the second time T2 depending on whether the voltage of the first output node TXP or the second output node TXN reaches a middle (or intermediate) voltage. For example, the middle voltage may be a voltage which is lower than the first reference voltage VREFP and is higher than the first common voltage VCMX or a voltage which is higher than the second reference voltage VREFN and is lower than the first common voltage VCMX.

Figure 8:
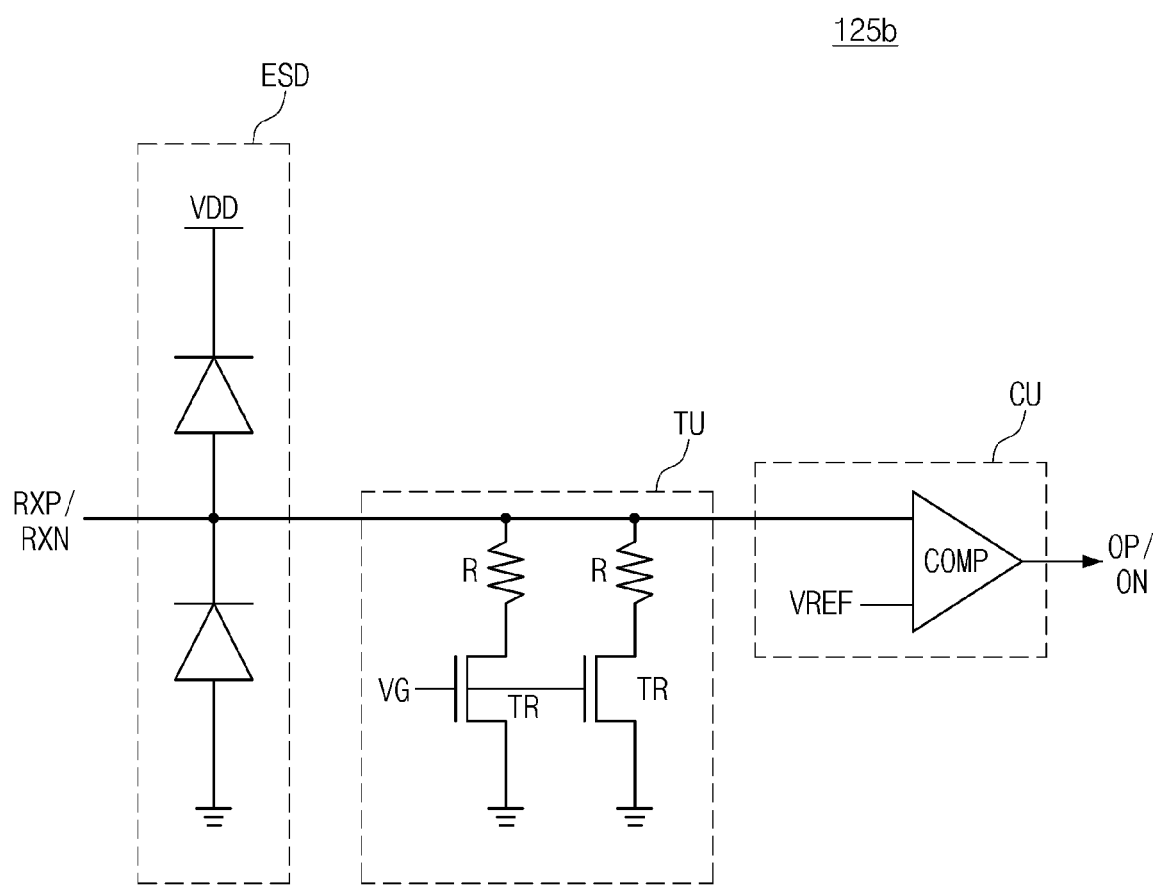
FIG. 8 is a circuit illustrating a receiver in accordance with a second example of the inventive concept.

FIG. 8 is a circuit illustrating a receiver 125*b* in accordance with a second example of the inventive concept. Constituents involved with the first input node RXP may be the same as constituents involved with the second input node RXN. For brevity of description, constituents involved with one of the first input node RXP and the second input node RXN of the receiver 125*b* are illustrated. Referring to FIGS. 2 and 8, the receiver 125*b* may include an overvoltage control unit ESD, a termination unit TU and a comparing unit CU.

The overvoltage control unit ESD may include diodes D1 and D2 that are serially connected between a power supply node from which a power supply voltage VDD is supplied and a ground node from which a ground voltage VSS is supplied. The overvoltage control unit ESD can prevent overvoltage from being supplied through the first input node RXP or the second input node RXN due to an external noise or an internal malfunction.

The termination unit TU is configured to provide an impedance matching between the transmission circuit TX and the reception circuit RX. The termination unit TU may include termination resistors R and transistors TR. The termination resistors R may be connected between the transistors TR and the first or second input node RXP or RXN. The termination resistors R may be connected to the ground node through the transistors TR, respectively. The transistors TR may have an N-type.

Gates of the transistors TR may be controlled by a gate voltage VG. For example, if the receiver 125*b* or the reception circuit RX including the receiver 125*b* is set to an active state, the transistors TR may be turned on in response to the gate voltage VG. That is, the termination resistor R may be applied to the first input node RXP or the second input node RXN. If the receiver 125*b* or the reception circuit RX including the receiver 125*b* is set to an inactive state, the transistors TR may be turned off in response to the gate voltage VG. That is, the termination resistor R may not be applied to the first input node RXP or the second input node RXN.

The comparing unit CU may include a comparator COMP. The comparator COMP can compare a voltage of the first input node RXP or the second input node RXN with a reference voltage VREF. A result of the comparison may be transmitted to the first output node OP or the second output node ON.

Figure 9A:
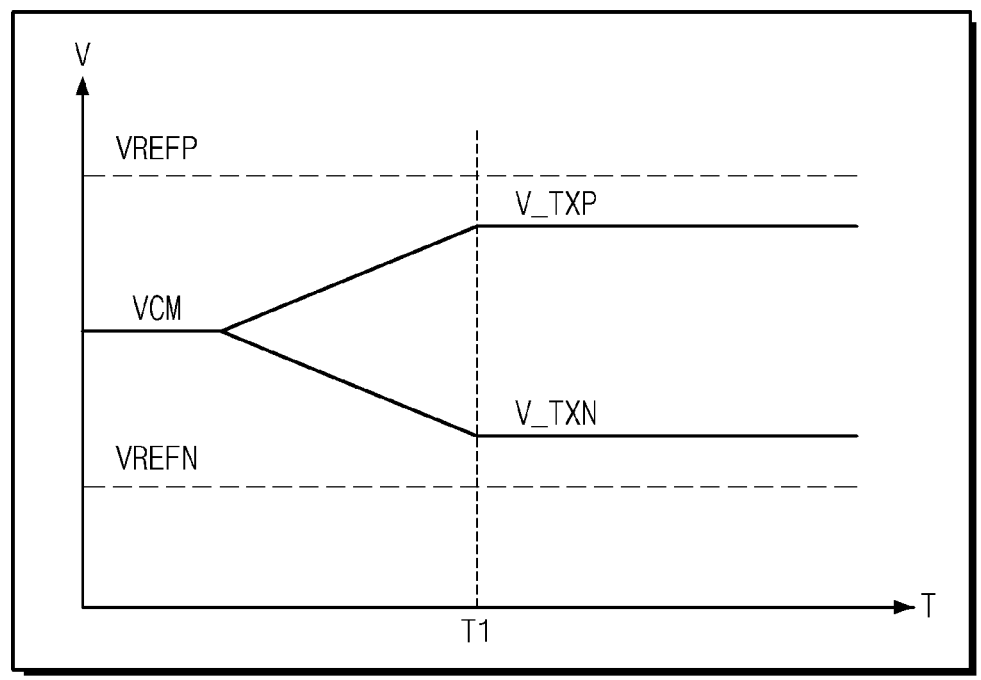
FIGS. 9A and 9B are a graph illustrating a change of voltages when a detection of a receiver is performed according to the second example of the inventive concept
Figure 9B:
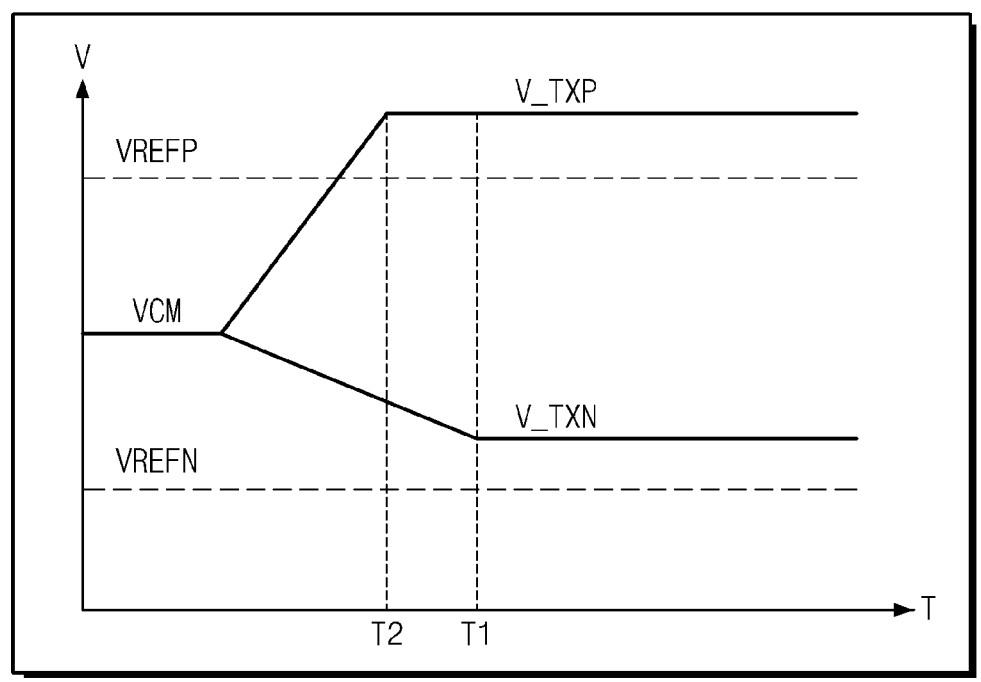

FIGS. 9A and 9B are a graph illustrating a change of voltages when a detection of a receiver is performed according to the second example of the inventive concept. With reference to FIGS. 2, 4, 8 and 9A, a change of voltages of the first output node TXP and the second output node TXN of the driver 111, when a reception circuit RX of an active state is connected to the first output node TXP and the second output node TXN of the driver 111, is explained.

Referring to FIG. 2, in a receiver detecting operation, the driver 111 can output a signal rising from the first common voltage VCMX through the first output node TXP and can output a signal falling from the first common voltage VCMX through the second output node TXN.

Referring to FIG. 8, when the transistors TR are turned on, the first input node RXP or the second input node RXN is connected to the power supply node through the termination resistors R. That is, the termination resistors R function as a load connected to the first capacitor C1 or the second capacitor C2.

Thus, as illustrated in FIGS. 2 and 9A, a voltage increment (e.g., the increment of a voltage that increases from the first common voltage VCMX to the power supply voltage VDD) corresponding to the first output node TXP is divided by the internal resistor IR and the termination resistors R. For example, a voltage of the first output node TXP may rise to a level lower than the first reference voltage VREFP for a first time T1 during which the first capacitor C1 is charged.

A voltage decrement of the second output node TXN (e.g., the decrement of a voltage that decreases from the first common voltage VCMX to the ground voltage VSS) is divided by the internal resistor IR and the termination resistors R. For example, a voltage of the second output node TXN may decrease to a level higher than the second reference voltage VREFN for a first time T1 during which the second capacitor C2 is charged.

With reference to FIGS. 2, 4, 8 and 9B, a change of voltages of the first output node TXP and the second output node TXN of the driver 111, when a reception circuit RX of an active state is not connected to the first output node TXP and the second output node TXN of the driver 111, is explained.

If a reception circuit RX having a pull-down termination becomes inactive, the reception circuit RX can charge the first input node RXP and the second input node RXN with the ground voltage VSS. For example, referring to FIG. 8, the transistors TR may be turned on and the first and second input nodes RXP and RXN may be charged with the ground voltage VSS. After that, the transistors TR may be turned off and the reception circuit RX may become inactive.

If the transistors TR are ideally open, the first and second input nodes RXP and RXN are open and have high impedance state (HIGH-Z). A voltage increment (e.g., the increment of a voltage that increases from the first common voltage VCMX to the power supply voltage VDD) corresponding to the first output node TXP is not divided by the internal resistor IR and the termination resistors R, and may be applied to the first output node TXP. Thus, a voltage of the first output node TXP may increase to a level higher than the first reference voltage VREFP. For example, the voltage of the first output node TXP may increase during a second time T2 shorter than the first time T1.

If the transistors TR are not ideally open, an error that the termination resistors R are applied to the first input node RXP or the second input node RXN may occur. An example in which a malfunction occurs in the first input node RXP or the second input node RXN is illustrated in FIG. 10.

Figure 10:
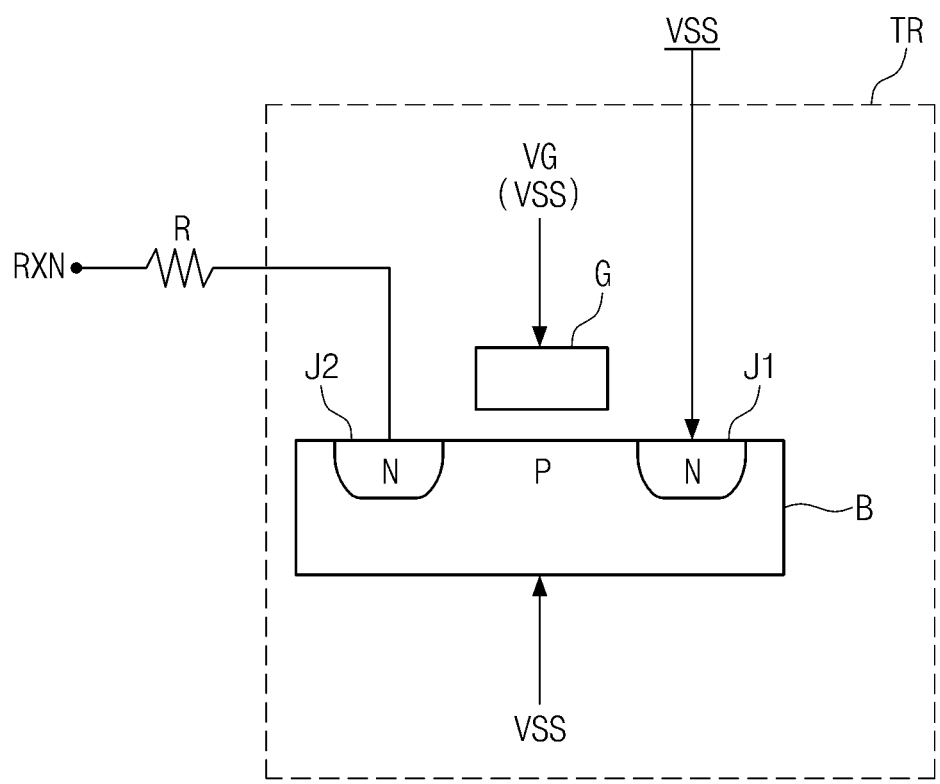
FIG. 10 illustrates another example that malfunction occurs at a first input node or a second input node.

Referring to FIG. 10, a termination resistor R and a transistor TR corresponding to the termination resistor R are illustrated. The transistor TR may include a P type body (B), an N type first junction (J1), an N type second junction (J2) and a gate (G). A gate voltage VG may be supplied to the gate (G). A ground voltage VSS is supplied as the gate voltage VG to turn off the transistor TR. The first junction (J1) may be connected to a ground node from which the ground voltage VSS is supplied. The second junction (J2) may be connected to the second input node RXN through the termination resistor R. The body (B) may be biased by the ground voltage VSS.

Referring to FIGS. 2, 9B and 10, a voltage of the second output node TXN may decrease from the first common voltage VCMX. Due to a coupling by the second capacitor C2, a voltage of the second input node RXN may also decrease. For example, the voltage of the second input node RXN may decrease from the ground voltage VSS.

The second junction (J2) and the body (B) of the transistor TR form a PN junction. If a voltage of the second input node RXN becomes lower than the ground voltage VSS, a leakage may occur between the second junction (J2) and the body (B) of the transistor TR. For example, if the second junction (J2) and the body (B) of the transistor TR are forward biased, a current path may be formed between the second input node RXN and the body (B). Thus, the termination resistor R may be applied to the second input node RXN. A voltage decrement (e.g., the decrement of a voltage that decreases from the first common voltage VCMX to the ground voltage VSS) corresponding to the second output node TXN may be divided by the internal resistor IR of the second output node TXN and the termination resistors R of the second input node RXN. Thus, a voltage of the second output node TXN may decrease to a level higher than the second reference voltage VREFN.

As illustrated in FIG. 4, when a voltage of the first output node TXP is lower than the first reference voltage VREFP and a voltage of the second output node TXN is higher than the second reference voltage VREFN, the receiver detector 113 determines that an activated reception circuit RX is connected to the first output node TXP and the second output node TXN. Thus, even if the malfunction occurs, the receiver detector 113 can normally distinguish whether the activated reception circuit RX is connected to the first output node TXP and the second output node TXN. Thus, reliability of the receiver detector 113 and a semiconductor device including the receiver detector 113 may be improved.

Figure 11:
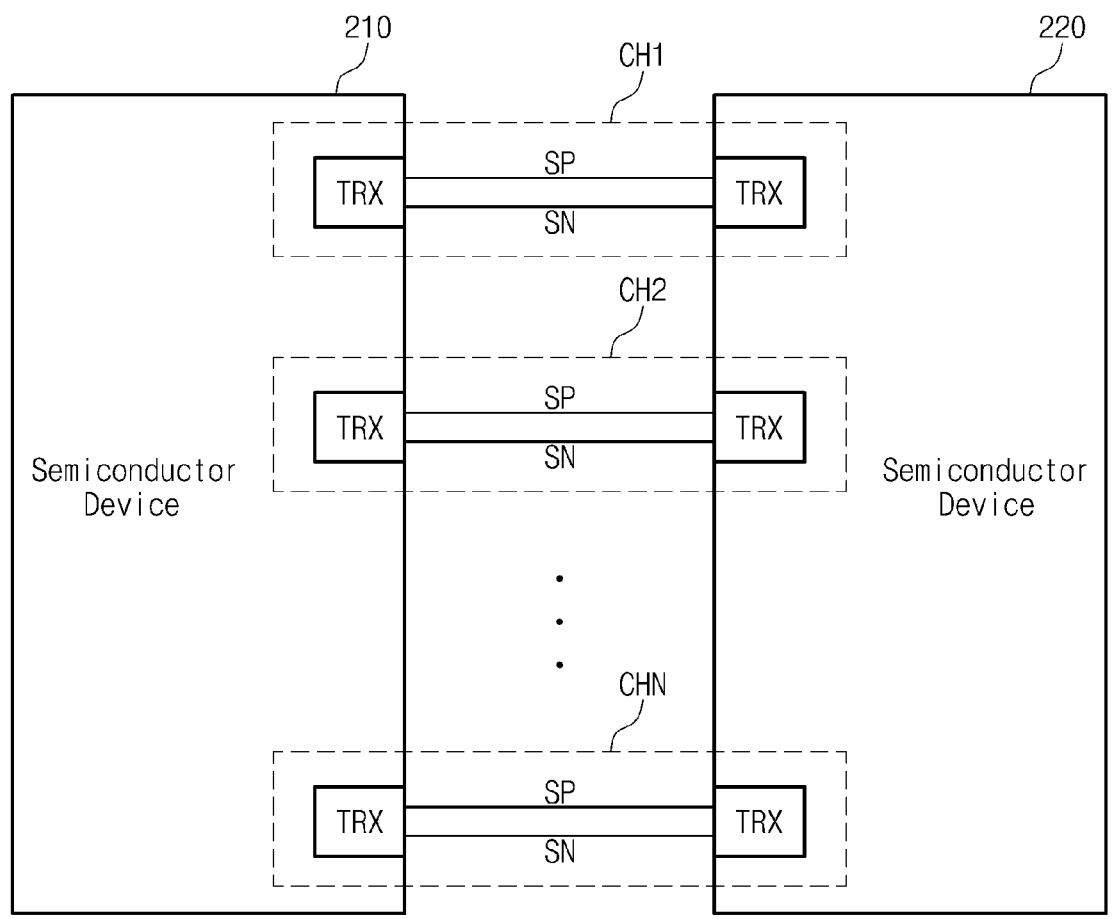
FIG. 11 is a block diagram illustrating a semiconductor system in accordance with an exemplary embodiment.

FIG. 11 is a block diagram illustrating a semiconductor system 200 in accordance with an exemplary embodiment. Referring to FIG. 11, a semiconductor system 200 may include a first semiconductor device 210 and a second semiconductor device 220.

The first and second semiconductor devices 210 and 220 are configured to communicate with each other through first through Nth channels CH1~CHN. The first semiconductor device 210 may include transmission/reception circuits TRX corresponding to the first through Nth channels CH1~CHN, respectively. The second semiconductor device 220 may include transmission/reception circuits TRX corresponding to the first through Nth channels CH1~CHN, respectively.

For example, in the first channel CH1, a transmission/reception circuit TRX of the first semiconductor device 210 may be connected to a transmission/reception circuit TRX of the second semiconductor device 220 through a first signal line SP and a second signal line SN. In the first channel CH1, the transmission/reception circuit TRX of the first semiconductor device 210 has the same structure as the transmission/reception circuit TRX of the second semiconductor device 220, and may operate in the same manner as the transmission/reception circuit TRX of the second semiconductor device 220.

The first semiconductor device 210 or the second semiconductor device 220 may include a function that can distinguish the number of active channels or the number of inactive channels. For example, the transmission/reception circuits TRX of the first semiconductor device 210 or the second semiconductor device 220 may include a receiver detecting function that distinguishes whether a reception circuit RX of an active state is connected.

Figure 12:
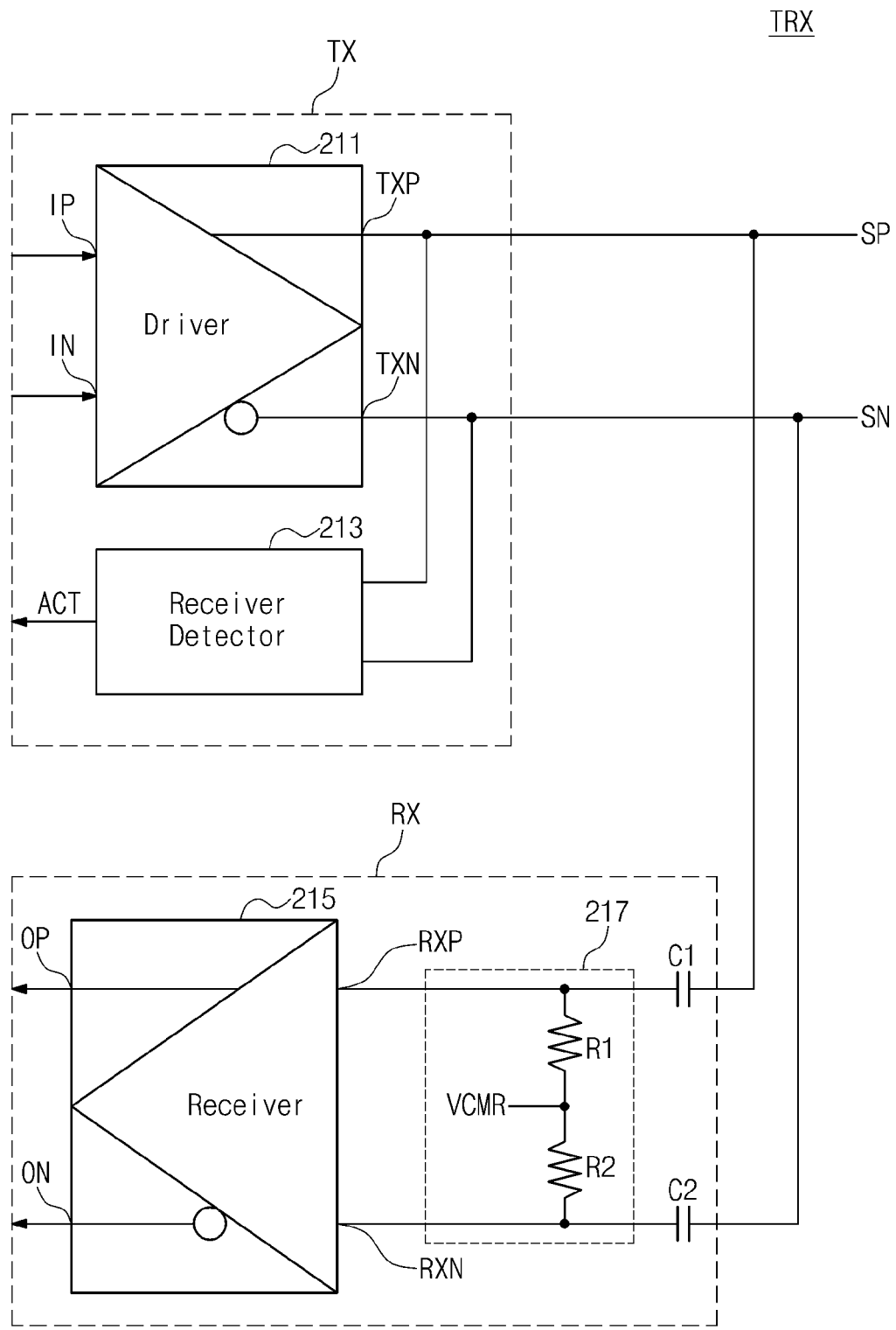
FIG. 12 illustrates a transmission/reception circuit in accordance with an exemplary embodiment.

FIG. 12 illustrates a transmission/reception circuit in accordance with an exemplary embodiment. One of the transmission/reception circuits TRX of the first semiconductor device 210 or the second semiconductor device 220 is illustrated in FIG. 12.

Referring to FIGS. 11 and 12, the transmission/reception circuit TRX may include a transmission circuit TX and a reception circuit RX. The transmission circuit TX may include a driver 211 and a receiver detector 213. The transmission circuit TX has the same structure as the transmission circuit TX described with reference to FIGS. 1 through 10 and may operate in the same manner. The reception circuit RX may include first and second capacitors C1 and C2, a receiver 215 and a balance circuit 217. The reception circuit RX has the same structure as the reception circuit RX described with reference to FIGS. 1 through 10 and may operate in the same manner.

The transmission circuit TX and the reception circuit RX may share a first signal line SP and a second signal line SN. The first signal line SP may be connected to a first output node TXP of a driver 211 of the transmission circuit TX and the first capacitor C1 of the reception circuit RX in common. The second signal line SN may be connected to a second output node TXN of the driver 211 of the transmission circuit TX and the second capacitor C2 of the reception circuit RX in common. The transmission/reception circuit TRX can perform a bidirectional communication using the first signal line SP and the second signal line SN.

As described with reference to FIGS. 1 through 10, the receiver detector 213 of the transmission circuit TX can distinguish whether a reception circuit RX of an active state of another semiconductor device is connected to the first output node TXP and the second output node TXN. For example, the receiver detector 213 of the transmission circuit TX of the transmission/reception circuit TRX of the first semiconductor device 210 can distinguish whether the transmission/reception circuit TRX of the second semiconductor device 220 is connected or the reception circuit RX of the transmission/reception circuit TRX corresponding to the second semiconductor device 220 is in an active state.

When the receiver detector 213 of the transmission circuit TX of the transmission/reception circuit TRX of the first semiconductor device 210 performs a receiver detecting operation, the reception circuit RX of the same transmission/reception circuit TRX may become inactive. For example, the termination resistors R of the receiver 215 of the reception circuit RX may be electrically separated from the first input node RXP and the second input node RXN.

Figure 13:
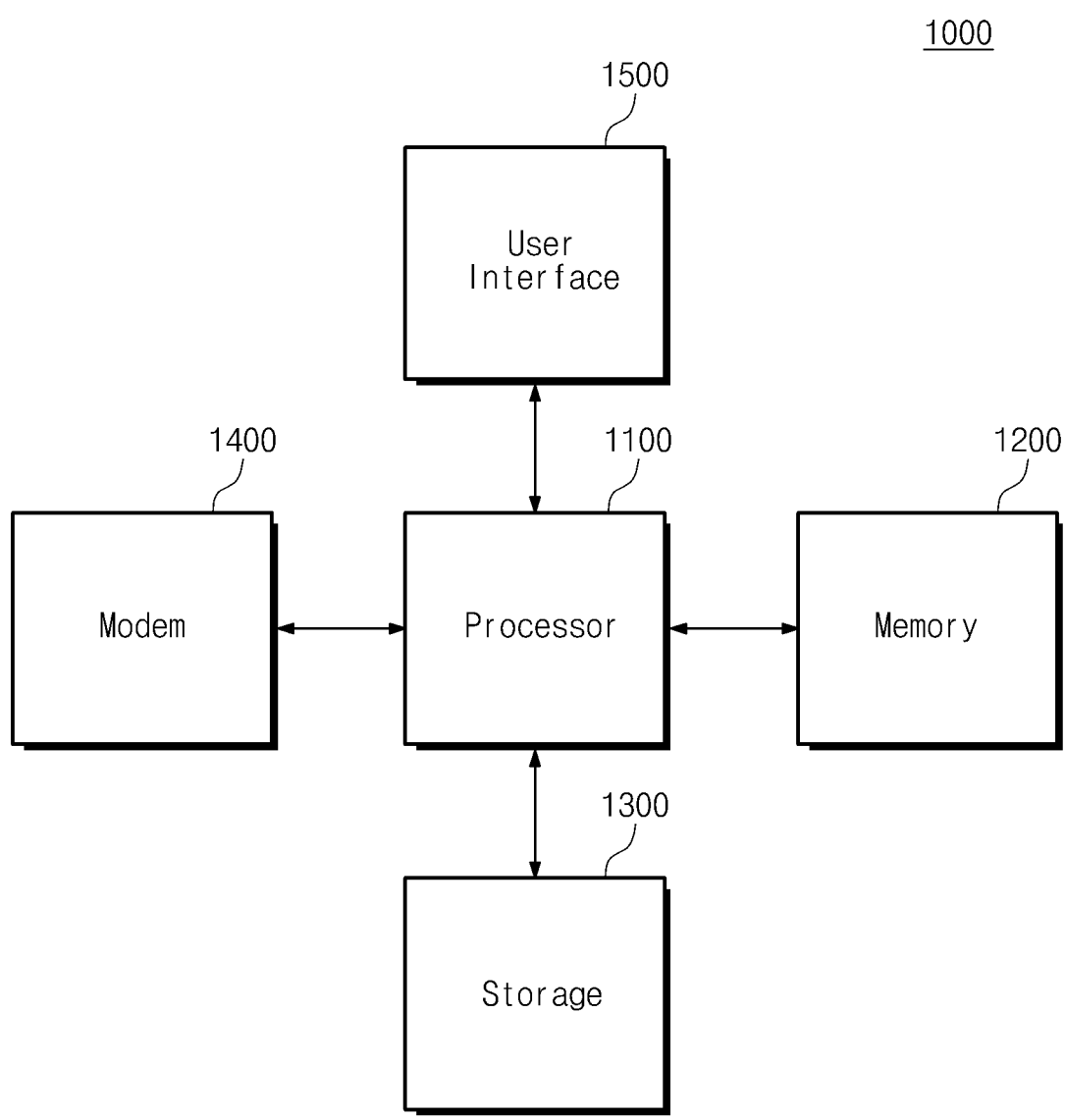
FIG. 13 is a block diagram illustrating a computing device in accordance with an exemplary embodiment.

FIG. 13 is a block diagram illustrating a computing device in accordance with an exemplary embodiment. Referring to FIG. 13, a computer 1000 may include a processor 1100, a memory 1200, a storage 1300, a modem 1400, and a user interface 1500.

The processor 1100 can control an overall operation of the computer 1000 and can perform a logical operation. For example, the processor 1100 may be implemented by a SoC (system-on-chip). The processor 1100 may be a general purpose processor, a special purpose processor or an application processor.

The memory 1200 can communicate with the processor 1100. The memory 1200 may be a main memory of the processor 1100 or the computer 1000. The processor 1100 can temporarily store code or data in the memory 1200. The processor 1100 can execute code using the memory 1200 and can process data. The processor 1100 can control an overall operation of the computer 1000 using the memory 1200. The memory 1200 may include a volatile memory such as a Static random-access memory (SRAM), a Dynamic random-access memory (DRAM), a Synchronous dynamic random access memory (SDRAM), etc., or a non-volatile memory such as a Phase-change random-access memory (PRAM), a Magnetoresistive random-access memory (MRAM), a Resistive random-access memory (RRAM), a Ferroelectric random-access memory (FeRAM), etc.

The storage 1300 can communicate with the processor 1100. The storage 1300 can store data that has to be preserved for a long time. That is, the processor 1100 can store data that has to be preserved for a long time in the storage 1300. The storage 1300 can store a boot image for driving the computer 1000. The storage 1300 can store source codes of various softwares such as an operating system, an application, etc. The storage 1300 can store data processed by various softwares such as an operating system, an application, etc.

The processor 1100 can drive various softwares such as an operating system, an application, etc. by loading source codes stored in the storage 1300 into the memory 1200 and executing the codes loaded in the memory 1200. The processor 1100 can load data stored in the storage 1300 into the memory 1200 and can process the data loaded into the memory 1200. The processor 1100 can store data desired to be preserved for a long time in the storage 1300.

The storage 1300 may include a nonvolatile memory such as a flash memory, a PRAM, a MRAM, an RRAM, a FeRAM, etc.

The modem 1400 can communicate with an external device under the control of the processor 1100. For example, the modem 1400 can perform a wired or wireless communication with the external device. The modem 1400 can perform a communication based on at least one of various wireless communication methods such as a long term evolution (LTE), a Worldwide Interoperability for Microwave Access (WiMax), a global system for mobile communication (GSM), a code division multiple access (CDMA), a Bluetooth, a near field communication (NFC), a WiFi, a radio frequency Identification (RFID), or at least one of various wired communication methods such as a universal serial bus (USB), a serial at attachment (SATA), a small computer small interface (SCSI), a Firewire, a peripheral component interconnection (PCI), a PCI express (PCIe), a nonvolatile memory express (NVMe), a universal flash storage (UFS), a secure digital (SD), a secure digital input output (SDIO), a universal asynchronous receiver transmitter (UART), a serial peripheral interface (SPI), a high speed SPI (HS-SPI), a RS-232, an inter-integrated circuit (I2C), a HS-I2C, an integrated-interchip sound (I2S), a sony/philips digital interface (S/PDIF), a multimedia card (MMC), an embedded MMC (eMMC), etc.

The user interface 1500 can communicate with a user under the control of the processor 1100. For example, the user interface 1500 may include user input interfaces such as a keyboard, a keypad, a button, a touch panel, a touch screen, a touch pad, a touch ball, a camera, a mike, a gyroscope sensor, a vibration sensor, a piezoelectric element, etc. The user interface 1500 may include user output interfaces such as a liquid crystal display (LCD), an organic light emitting diode (OLED) display, an active matrix OLED (AMOLED) display, a light-emitting diode (LED), a speaker, a motor, etc.

The processor 1100, the memory 1200, the storage 1300, the modem 1400, and the user interface 1500 can correspond to the first semiconductor device 110 or 210, or the second semiconductor device 120 or 220, respectively. That is, the transmission circuits TX and the reception circuits RX, or the transmission/reception circuits TRX may be configured to perform a communication between at least two of the processor 1100, the memory 1200, the storage 1300, the modem 1400, and the user interface 1500.

According to the above exemplary embodiment, reliability of an operation of distinguishing whether a transmission circuit of a semiconductor device is connected to a reception circuit is improved. Thus, a semiconductor device having improved reliability, a semiconductor system and an operation method of a semiconductor device may be provided.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

The foregoing is illustrative of exemplary embodiments, and is not to be construed as limiting thereof. Although a few exemplary embodiments have been described, those skilled in the art will readily appreciate that many modifications are possible without materially departing from the novel teachings and advantages. Accordingly, all such modifications are intended to be included within the scope of this inventive concept as defined in the claims.

What is claimed is:

1. A semiconductor device comprising:
   a driver configured to output first and second signals complementary to each other through first and second nodes, respectively; and
   a receiver detector configured to detect whether a reception circuit of an active state is connected to the first and second nodes according to a voltage of the first node and a voltage of the second node,
   wherein the receiver detector is configured to compare the voltage of the first node with a first reference voltage, compare the voltage of the second node with a second reference voltage, which is different from the first reference voltage, and detect whether the reception circuit of the active state is connected according to a comparison result of the voltage of the first node and a comparison result of the voltage of the second node.

2. The semiconductor device of claim 1, wherein the receiver detector is further configured to determine that the reception circuit of the active state is not connected in response to detecting that the voltage of the first node is higher than the first reference voltage or the voltage of the second node is lower than the second reference voltage, the second reference voltage being lower than the first reference voltage.

3. The semiconductor device of claim 1, wherein the receiver detector is further configured to determine that the reception circuit of the active state is connected in response to detecting that the voltage of the first node is lower than the first reference voltage and the voltage of the second node is higher than the second reference voltage, the second reference voltage being lower than the first reference voltage.

4. The semiconductor device of claim 1, wherein the receiver detector comprises:
   a first comparator configured to output a high level signal in response to determining that the voltage of the first node is lower than the first reference voltage;
   a second comparator configured to output a high level signal in response to determining that the voltage of the second node is higher than the second reference voltage; and a logical gate circuit configured to output a logical AND of an output of the first comparator and an output of the second comparator,
wherein in response to determining that an output of the logical gate circuit is high level, it is determined that the reception circuit of the active state is connected.

5. The semiconductor device of claim 4, wherein the receiver detector further comprises first through fourth resistors serially connected between a power supply node from which a power supply voltage is supplied and a ground node from which a ground voltage is supplied,
wherein a voltage of a node between the first and second resistors adjacent to the power supply node is used as the first reference voltage, and
wherein a voltage of a node between the third and fourth resistors adjacent to the ground node is used as the second reference voltage.

6. The semiconductor device of claim 1, wherein the driver is further configured to output a third signal increasing from a common voltage to a first voltage which is higher than the common voltage through the first node and output a fourth signal decreasing from the common voltage to a second voltage which is lower than the common voltage through the second node when the receiver detector detects the reception circuit.

7. The semiconductor device of claim 1, wherein in response to determining that a power supply is supplied to the semiconductor device, the receiver detector is configured to detect the reception circuit.

8. The semiconductor device of claim 1, wherein in response to determining that the reception circuit of the active state is not connected, the driver becomes inactive.

9. The semiconductor device of claim 1, further comprising a second reception circuit configured to be connected to the first node and the second node and receive third and fourth signals complementary to each other being transmitted from an external device.

10. The semiconductor device of claim 1, wherein the receiver detector is further configured to detect an active state of the reception circuit by using a slope that the voltage of the first node increases and a slope that the voltage of the second node decreases.

11. A semiconductor system comprising:
a first semiconductor device comprising transmission circuits;
a second semiconductor device comprising reception circuits; and
channels connecting the transmission circuits and the reception circuits, respectively,
wherein each of the transmission circuits is connected to a corresponding reception circuit among the reception circuits through a first signal line and a second signal line of a corresponding channel among the channels, and
wherein each of the transmission circuits is configured to detect whether the corresponding reception circuit is in an active state by comparing a voltage of the first signal line and a voltage of the second signal line with a first reference voltage and a second reference voltage different from the first reference voltage, respectively.

12. The semiconductor system of claim 11, wherein each of the transmission circuits is further configured to determine that the corresponding reception circuit is in an inactive state in response to detecting that at least one of the voltage of the first signal line and the voltage of the second signal line indicates that the corresponding reception circuit is in an inactive state.

13. The semiconductor system of claim 11, wherein each of the transmission circuits is further configured to determine that the corresponding reception circuit is in an active state in response to detecting that the voltage of the first signal line is lower than a first reference voltage and the voltage of the second signal line is higher than a second reference voltage, the second reference voltage being lower than the first reference voltage.

14. The semiconductor system of claim 11, wherein the first semiconductor device further comprises second reception circuits,
wherein the second semiconductor device further comprises second transmission circuits, and
wherein the semiconductor system further comprises second channels connecting the second transmission circuits and the second reception circuits, respectively.

15. The semiconductor system of claim 14, wherein each of the second transmission circuits is connected to a corresponding second reception circuit among the second reception circuits through a third signal line and a fourth signal line of a corresponding second channel among the second channels, and
wherein each of the second transmission circuits is configured to detect whether the corresponding second reception circuit is in an active state according to a voltage of the third signal line and a voltage of the fourth signal line.

16. The semiconductor system of claim 11, wherein the first semiconductor device further comprises second reception circuits,
wherein the second semiconductor device further comprises second transmission circuits, and
wherein the second transmission circuits are connected to the second reception circuits respectively through the channels.

17. The semiconductor system of claim 16, wherein each of the second transmission circuits is configured to detect whether the corresponding second receiving circuit is in an active state according to the voltage of the first signal line and the voltage of the second signal line.

18. The semiconductor system of claim 16, wherein the second reception circuits of the first semiconductor device become inactive while the transmission circuits of the first semiconductor device detect the reception circuits of the second semiconductor device respectively.

19. A semiconductor system comprising:
a first semiconductor device comprising transmission circuits;
a second semiconductor device comprising reception circuits; and
channels connecting the transmission circuits and the reception circuits, respectively,
wherein the first semiconductor device comprises:
a driver configured to output first and second signals complementary to each other through first and second nodes, respectively; and
a receiver detector configured to detect whether a reception circuit of an active state is connected to the first node and the second node by comparing a voltage of the first node and a voltage of the second node with a first reference voltage and a second reference voltage different from the first reference voltage, respectively,
wherein the second semiconductor device comprising:
a receiver configured to output first and second signals to core circuits of the first semiconductor device and the second semiconductor device, respectively; and a balance circuit configured to provide a balance between voltages of a first input node and a second input node, and wherein each of the transmission circuits is configured to detect whether the corresponding reception circuit is in an active state according to a voltage of a first signal line and a voltage of a second signal line.

20. The semiconductor system of claim 19, wherein the balance circuit of the second semiconductor device further comprises first and second resistors which are serially connected between the first and second input nodes, and control voltages of the first and second input nodes so that a voltage of the first input node and a voltage of the second input node swing with a common voltage as a center.

* * * * *